July 14, 1936.   C. B. HILLHOUSE   2,047,870
METHOD FOR PRODUCING GAS
Filed March 24, 1932   3 Sheets-Sheet 1
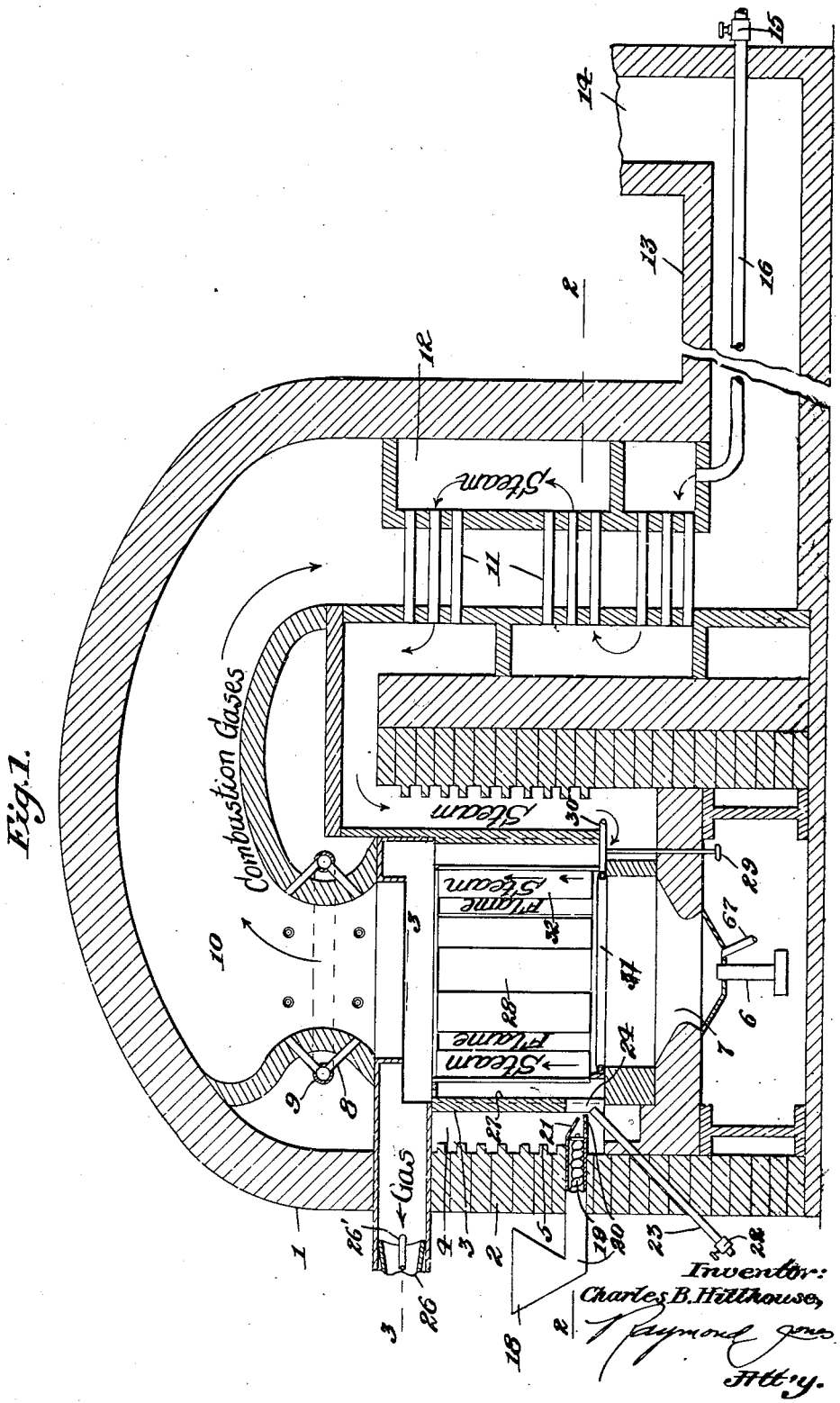

July 14, 1936.  C. B. HILLHOUSE  2,047,870
METHOD FOR PRODUCING GAS
Filed March 24, 1932  3 Sheets-Sheet 2
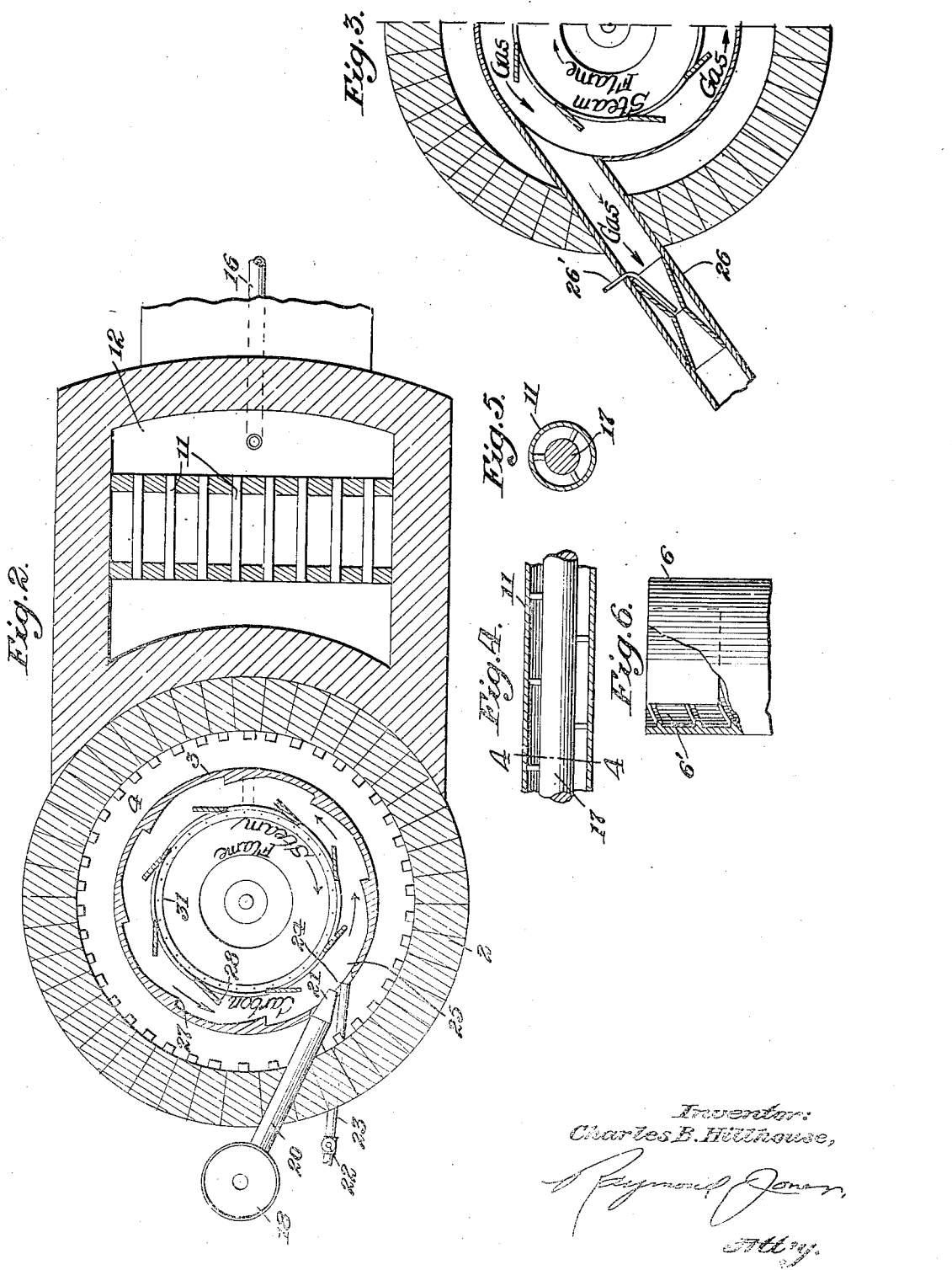
Inventor:
Charles B. Hillhouse,
Atty.

July 14, 1936.  C. B. HILLHOUSE  2,047,870
METHOD FOR PRODUCING GAS
Filed March 24, 1932  3 Sheets-Sheet 3
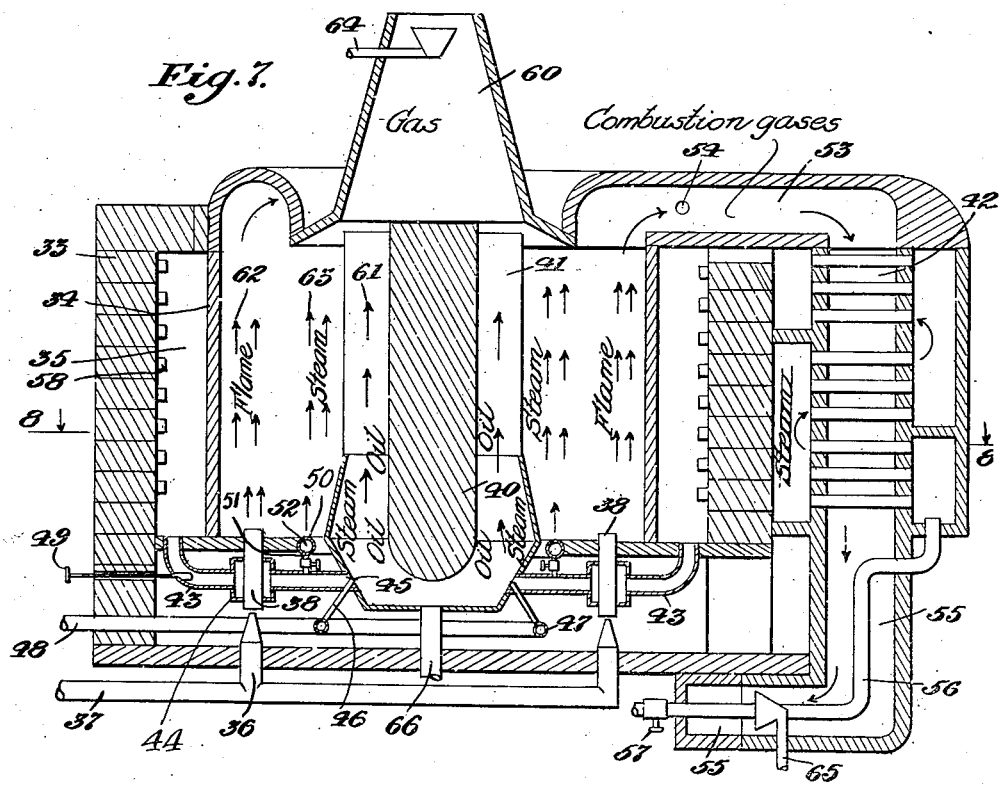
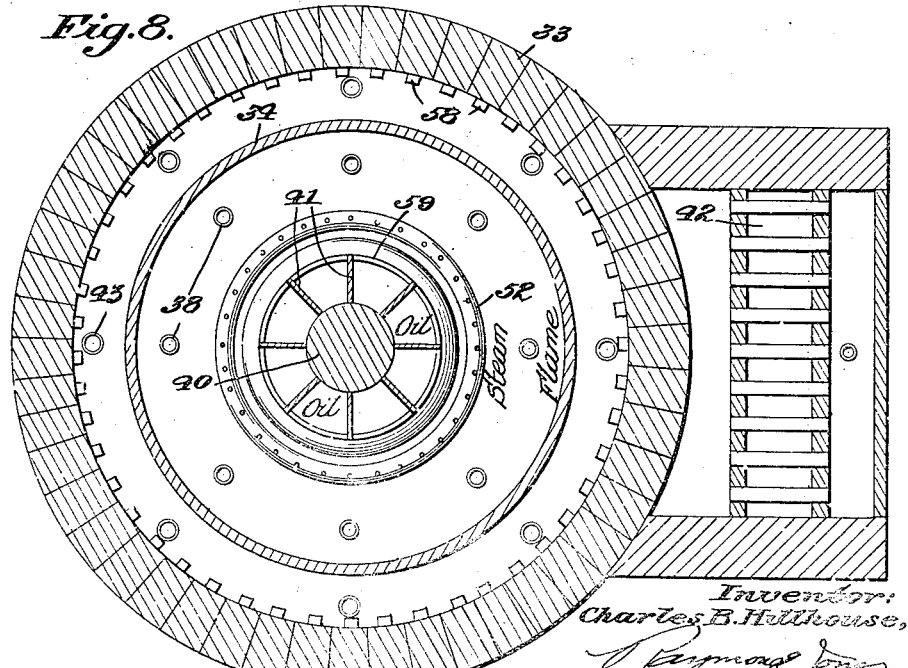

Patented July 14, 1936

2,047,870

UNITED STATES PATENT OFFICE 2,047,870

METHOD FOR PRODUCING GAS

Charles B. Hillhouse, New York, N. Y., assignor to Sylvia Remsen Hillhouse, New York, N. Y.

Application March 24, 1932, Serial No. 601,015

4 Claims. (Cl. 48—202)

My invention relates to a method and apparatus for producing gas and more particularly to a continuous gas producing process, wherein an independent heating agent without a muffle and gas producing materials are more or less in marginal contact in the same chamber and moving in respective paths relatively in opposite directions, or in the same direction.

The main object of my invention is to provide a means and method whereby the gas forming materials are subjected to such treatment prior to and during their admission to the gas generator as will bring about a flash formation of combustible gas.

Another object is to provide means for moving a continuous supply of gas forming materials with relation to, and in substantial marginal contact with, a heating medium in a manner to obtain a maximum interchange of heat and, at the same time, to prevent mixing of the materials and made gases with the products of combustion.

Another object is to provide means along the zone of contact of the gas forming materials and the heating agent for preventing intermingling or suction between the lines of flow of the materials and agent, and to add heated solid surface in the path of the current of gas making materials.

Another object is to increase the efficiency of gas producers by a transfer of heat from the gases of combustion into the supply of a gas forming material prior to its entrance into the generator, so that the only heat the heating agent will be called upon to furnish in the generator will be the heat of absorption required in gasification.

Other objects will become apparent from the accompanying detailed specification.

This application is a continuation in part of my prior application, Serial No. 631,778, filed April 13, 1923, and it embodies improvements over the disclosure of that application and my co-pending application, Serial No. 583,577, filed December 28, 1931.

The essential improvement relates mainly to the use of a more efficient method of preheating the gas forming materials than is shown by those applications or prior art devices. Another improvement relates to the use of deflectors positioned along the line or zone of marginal contact of the gas forming materials and heating agent in a manner to overcome any tendency to set up a suction between the materials and agent which would permit either of these to draw upon the other and cause a mixing thereof.

The main features that are common to this application and the aforesaid applications relates to the provision of an axial heating agent, preferably a flame having a maximum of heat intensity, and subjecting to this flame in more or less marginal contact therewith, a continuous supply of gas forming materials which are caused to travel at suitable velocity in a path either around or along the zone of combustion of the axial flame. As a further improvement, I subject the gas forming materials only to the hottest section of the flame, thereby reducing to a minimum the length of the contact or heat absorbing zone, whereby to lessen the tendency of mixing of the materials and combustion gases. I am enabled to do this because a lesser amount of heat is to be absorbed by the materials supplied to the present apparatus than to that of my prior applications, due to my improved method of preheating the materials.

In gas generators which utilize steam to act on the solid materials, some 50% of the heat from the combusted fuel must be expended in preheating the steam, and it is desirable to employ the most efficient means to cause all of the preheating of the steam prior to its entrance into the gas generator rather than cause the whole or a part of the preheating to occur within the generator in a manner to reduce its efficiency.

It follows then, if the gas making materials, separately or when united, have been raised to their combining temperature that the entire heat expended in the gasifier will be only that necessary to furnish continuously the heat absorbed in gasification of the gas making materials, and, when this has been allowed, there will remain in the gases of combustion a maximum of heat energy. These hot gases of combustion may then be supplied to a steam or carbon dioxide recuperator which results in imparting a maximum of heat to the steam or carbon dioxide and permits the recuperator and gasifier to operate at their maximum efficiency. The higher that steam or carbon dioxide can be preheated prior to admission to the gasifier, the less absorbed heat will be required in the gasifier.

This can be illustrated with the gasification of 1 pound of carbon with 1½ pounds of steam.

Heat required to dissociate 1½#
  steam when incandescent carbon
  is not present_____ 8626 B. t. u.
Deduct when 1# of carbon is present in gasification for combustion with oxygen of steam_____ 4400 B. t. u.
                                            —————
                                            4226 B. t. u.

Deduct for sensible
heat in steam at
2200 degrees F____ 2775 B. t. u.
Deduct for sensible
heat in carbon at
500 degrees F_____ 150 B. t. u.
                   ─────────────
                   2925 B. t. u.   2925 B. t. u.
                                   ─────────────
                                   1301 B. t. u.

Net heat absorbed which must be continuously supplied in gasifier which shows a reduction of over 66% in heat required in gasifier_

The temperature at which gasification takes place in the gasifier between carbon and steam is 1832 degrees F. It may be more efficient to preheat a soft coal to higher temperatures by means of preheated steam than by other means, and this is shown by the above illustration. That is, the added sensible heat of both carbon and steam in combining proportions should be sufficient for gas making reactions.

By the use of certain types of recuperators, steam to be preheated should enter under a small but controllable pressure sufficient to overcome frictional resistance as the steam passes through the recuperator, and this will leave the highly heated steam surrounding the gasifier under a slight but controllable pressure which is a desirable feature.

While the accompanying drawings show an upwardly directed annular flame, it is to be understood that a downwardly directed flame could be used and the flame could have controllable revolution.

In the drawings—

Figure 1 is a sectional elevation of my preferred form of apparatus in carrying out the process;

Fig. 2 is a sectional view looking down on the line 2—2 in Fig. 1;

Fig. 3 is a sectional view looking down on the line 3—3 in Fig. 1;

Fig. 4 is a detail view of a heat exchanging recuperator tube;

Fig. 5 is a sectional view on line 4—4 of Fig. 4;

Fig. 6 is a detail view of a fuel burner;

Fig. 7 shows a sectional elevation of a modification wherein combustion takes place at the walls of a chamber and the gas making proceeds along the axis; and Fig. 8 is a sectional view on the line 8—8 in Fig. 7.

Referring to Figure 1, a combustible gas generator 1 is shown preferably in circular form. The generator comprises an outer wall 2 of insulating brick and an inner wall 3 formed preferably from thin carborundum. The space 4 between the walls 2 and 3 is utilized as a steam space positioned in indirect heat exchange relation through the wall 3 with the central heated gas forming zone. On the inner face of the wall 2 are arranged a plurality of heat retaining and heat emitting bricks or protuberances 5 which are effective to maintain the steam at its high temperature as well as to add heat thereto. A fuel burner 6 is located to project within the central lower portion of the generator and may be supplied with fuel in the form of coal, gas, or oil to provide an annular axial flame 7 which extends substantially to the top of the generator. The flame 7 may be caused to revolve as shown by the arrows in Fig. 2, and the revolution of this flame may be controlled in a desired manner. A rotary motion or whirl may be imparted to the flame for example, as shown in Fig. 6, by providing a series of spirally arranged jet passages 6' spaced around the periphery of the top of the burner. The flame should be a reducing flame so as not to have a chemical affinity for carbon or made-gas in the adjacent gas making materials. Secondary air may be admitted at the top of the generator through the jets 8 leading from central air pipe 9 at a point adjacent the outlet for the gases of combustion and, owing to the reducing character of the flame, the final combustion adjacent the air jets 8 will bring the temperature of the gases of combustion to a high degree and these gases will be drawn through the outlet passage 10 and downwardly over the tubes 11 of a recuperator 12 and thence through a passage 13 to the stack outlet 14. The preferred type of recuperator is of continuous character so as to avoid accession of nitrogen and carbon dioxide in the preheated steam. Steam is admitted through the valve 15 into a metallic pipe 16 which passes through the passage 13 in a manner to heat the steam by the hot gases in that passage. This steam is admitted at about 10 pounds pressure. This heated steam is passed into the lower end of the recuperator and, after traversing the several heat exchange tubes 11 in series, where it is preheated highly, the steam is then passed to the steam space 4. As shown in Figs. 4 and 5, the tubes 11 are provided with a central "core-buster" 17 which causes the steam to pass in a thin stream along the hot walls of the tubes. Most of the initial pressure of the steam is consumed or reduced as the steam overcomes the resistance of the tubes and other passages. The steam may be heated to about 800 degrees F. in the metal pipe 16 by the hot gases from the recuperator which are at about 1500 degrees F. It is expected to preheat steam in the recuperator from 800 to over 2000 degrees F. and the steam after passing to the space 4 in contact with the wall 3 and bricks 5 will be maintained at this temperature or even raised from 100 to 200 degrees more. It is entirely feasible to attain such steam temperature since it is possible to preheat steam in some intermittent types of checker fire-brick recuperators to 2500 degrees F.

Pulverized bituminous coal from the hopper 18 preferably preheated to 500 degrees F. is fed by a conveyor screw 19 through conduit 20 to an outlet 21 shown in Fig. 2. Steam at high pressure is admitted through a valve 22 and pipe 23 operating as an injector at the point 24 and this steam picks up the coal and projects it tangentially from a jet 25 along the inner face of the wall 3 and in an upward direction, the coal and steam being in thoroughly mixed condition. Steam from the space 4 is drawn into the stream of coal and through the throat of the jet 25 adjacent the point 24. The stream of coal and steam is whirled in a helical path upwardly around the flame 7 and throughout its travel towards the top of the generator these gas forming materials are caused to combine to form a made combustible gas which is drawn off through the tangential gas outlet 26, flame 7 supplying the heat absorbed in gas combinations. In order to reduce the amount of steam fed through conduits 23, I prefer to restrict the gas outlet and employ a steam injector 26' to assist in withdrawing the made gases.

A series of deflectors 27 is arranged at spaced points over the inner face of the wall 3 to divert the gas forming materials away from that wall and towards the flame 7. It is well known that a helically moving current of mixed gaseous fluid and solid material would tend to throw the heavier material tangentially against the outer confining wall. In my application, Serial No. 583,577, I have shown a series of steps on the face of the inner generator wall which function to scatter the carbon at the wall and mix it with the steam. The use of the deflectors 27 is a distinct improvement over such stepped formation in that their use greatly reduces the size of the generator and, by retaining a uniform shaft diameter, a better control of the flame may be maintained. A carborundum wall of such construction will continuously direct highly heated gas making materials from the wall towards the center of the helical current. This efficient mixing feature greatly reduces the time necessary for flash gas making since it maintains the material well mixed as well as highly heated uniformly throughout. This result is secured by causing the steam and other materials to continuously impinge against solid highly heated substances, namely, the baffles 28 and the opposite carborundum wall 3 with its attached deflectors 27.

As best shown in Fig. 2, I provide a series of thin baffles 28 arranged along the line of marginal contact of the flame 7 and the adjacent whirling mass of gas forming materials. These baffles or deflectors are formed from thin carborundum and serve the double purpose of firstly increasing by about 50% the heated solid surface that the helical current of gas making materials may impinge against and to be deflected therefrom toward the center of the current of gas forming materials, and, secondly, to keep the gases of combustion from working outside of their desired path. These deflectors will not interfere with the gas reactions obtaining enough heat for absorption on account of the large reduction in heat requirements by the high temperature of the steam or carbon dioxide. These deflectors are not shown in Fig. 1, but are shown in sectional form in Fig. 2.

In order to further assist in preventing any mixing of the gases of combustion of the axial flame and the helically moving gas making materials, I may provide an annular curtain of heated steam between the margin of the flame and the current of gas making materials. Steam may be passed from the space 4 through a valve 29 and conduit 30 to an annular jet 31 from which the steam curtain is projected upwardly as shown by the arrows 32 in Fig. 1. The object of this steam curtain is for this steam to flow to any point where one or the other of the oppositely flowing currents may tend to set up a suction and to break this suction. No harm will result in the steam entering either the gases of combustion or the helical current of gas making materials.

In the operation of the combustible gas generator disclosed, the stream of gas forming materials thoroughly mixed with preheated steam is injected into the generator at suitable velocity through the tangential inlet 25. One or more of such jets may be provided according to the design or needs of the generator. It will be noted that the distance from the jet 25 to the gas outlet 26 is relatively rather short, and the stream of materials is caused to pass along the hottest zone of the flame 7. Due to the preheating of the coal and steam, these materials actually flash into made gases immediately upon their entrance into the generator, hence a short travel of these materials is permitted, thereby reducing the tendency towards suction between the flame gas and whirling materials which would cause undue mixing therebetween. The gas forming materials pass helically around the flame and upwardly during which short travel, the gas reactions become completed and the made gas is drawn off through the outlet 26. The fact that the flame 7 is a reducing one will permit a maximum efficiency of gas reactions. By preheating the steam and coal, a minimum of heat absorption from the flame 7 occurs and this permits gases of combustion at a high temperature to pass off into the recuperator, thereby raising its efficiency in preheating steam.

In the modification of Fig. 7, a generator is shown as arranged to permit combustion adjacent the generator wall and gas reactions adjacent the axis of the generator. The generator comprises an outer insulating wall 33 and an inner carborundum wall 34 spaced therefrom to provide a steam space 35. A series of fuel burners 36, preferably eight, are supplied with fuel from a common conduit 37. The flame from these burners pass through carbon inlet tubes 38 arranged adjacent the wall 34. A post 40 is arranged in the center of the generator and is provided with multiple radial or spiral vanes 41 extending part way to wall 34. The vanes are formed preferably from carborundum and will pick up heat from flame and transfer it to the gas making materials. Steam which has been highly heated in the recuperator 42 and stored in the space 35, is passed therefrom through a series of passages 43. Each passage leads into a jacket 44 that surrounds a tube 38 in a manner to further preheat the steam indirectly by means of the flame passing through each tube from its corresponding burner. This highly heated steam is admitted through the bottom wall of the generator at the orifice 45, there being an equal number of steam inlets and flame jets or tubes 38. In the generator shown, the gas making materials are oil and steam. The oil is admitted from jets constructed in the form of injectors 46, the nozzles of which terminate adjacent the orifices 45 in a manner to draw steam into the generator along with the oil. The injectors are supplied from a common ring conduit 47 which is fed by an oil supply pipe 48. Valves 49 may be used to control the flow of steam. While I have described the use of oil in Fig. 7, it is contemplated that coal dust may be supplied through the pipes 46.

The oil and steam pass upwardly along the post 40 and between the vanes 41. In order to maintain a screen or curtain of steam between the flame and the gas forming materials, a ring conduit 50 supplied by steam from the passages 43 through pipes 51 is arranged to project a stream of steam upwardly from a series of jets 52 in the conduit 50. The flame from the tubes 38 is a reducing flame and extends to the top of the generator and the products of combustion thereof are conducted through the outlet 53 into the recuperator. Secondary air is supplied through air inlets 54. The completely burned gases leave the recuperator through a passage 55. Steam at low pressure is supplied to the recuperator from a conduit 56 controlled by a valve 57. This conduit extends through the passage 55 in a manner to preheat the new steam. The wall 33 is provided with checker brick protuberances 58 similar to those shown in Fig. 1 and for the same purpose. A deflector wall 59 is positioned to cause the oil spray and steam to pass upwardly along the vanes 41.

Oil is mixed into highly heated steam by injectors 46 and raised to practically combining temperature so the mixture is in a condition to flash into gas reactions with very little additional heat, and this heat is supplied by the flame from the jets 38. The gas forming materials and the heating flame both move upwardly at regulatable velocities for which I have provided accelerators at the two outlets. A relatively short time and distance of travel of the gas forming materials is necessary to produce a combustible gas by this method. The vanes 41 function to transfer heat into the materials, thereby increasing the efficiency of heat transfer due to the presence of the central post 40. The made gases are withdrawn from the generator through the outlet 60 with a steam ejector.

The generator shown in Fig. 7 is particularly advantageous when highly preheated gas materials are used since this generator is constructed to permit a relatively short travel of gas materials and heating flame, this being possible because a flash gas reaction occurs substantially as soon as the materials enter the generator and are under the influence of combustion to supply heat of absorption. The stream of gas forming materials, indicated by the arrows 61, is separated from the flame, indicated by arrows 62, by means of a sheet of steam shown by arrows 63. This sheet or curtain of steam acts to prevent mixing of gases of combustion and materials. A portion of this steam curtain may be consumed by the gas reaction or pass off in the gases of combustion.

A controllable jet accelerator 64 may be provided in gas outlet 60 and a similar accelerator 65 in the flue 55 to harmonize the drafts in these outlets.

In order to dispose of the slag from the coal ash, a small percentage of lime or other flux may be added to the powdered coal and it will flux the silicious ash and it will liquefy at a temperature lower than the minimum generator temperature, and it can be run off from outlets 66 or 67 and be made a useful by-product.

The continuous gas producing generator disclosed is very efficient in operation and can produce a combustible gas from cheap materials at a relatively low cost. It is simple in operation as well as economical to install and maintain.

While I have shown and described a preferred form of improved gas generator and process of combustible gas making, it is to be understood that various modifications thereof are contemplated as will be embraced within the scope of the appended claims.

What I claim is—

1. The method of producing a combustible gas which comprises the steps of burning a fuel to produce an axial flame feeding continuously tangentially to said axial flame, a stream of gasifiable materials, directly communicating the inner zone of combustion with the outer zone of gasifying materials to heat the latter thereby, passing said materials at suitable velocity around said flame but spaced therefrom in a whirling stream and the chamber wall and deflecting the stream of materials at spaced points away from the axial flame to prevent mixing of flame and materials.

2. In the method as set forth in claim 1, the additional step of causing the axial flame to whirl along its axial path of movement.

3. The method of making gas which comprises maintaining an axial zone of combustion, maintaining an outer zone of gas making materials in motion along a helical path around said axial zone, and directly comunicating said zones with each other through an annular series of spaced heat exchange gaps whereby heat from the axial combustion zone acts in an unmuffled relation through the gaps upon said materials without substantial mixing of gases of combustion into the made gases.

4. In the method as set forth in claim 1, the additional step of maintaining a curtain of steam between the zones of combustion and whirling materials.

CHARLES B. HILLHOUSE.